3,179,654
PROCESS FOR THE PREPARATION OF DIGLYCOSYLUREAS

Paul R. Steyermark, Silver Spring, Md., assignor to W. R. Grace & Co., a corporation of Connecticut
No Drawing. Filed Feb. 14, 1963, Ser. No. 258,651
5 Claims. (Cl. 260—211.5)

This application is a continuation-in-part of my co-pending application, Serial No. 126,525, filed July 25, 1961, and now abandoned, which is in turn, a continuation-in-part of application Serial No. 4,874, filed March 29, 1960, now abandoned.

This invention relates to a process for the preparation of diglycosylureas or, more properly, 1,3-diglycosylureas. More particularly, the invention relates to a process for the preparation of 1,3-diglycosylureas by the reaction of at least two moles of an aldose with one mole of urea in the presence of a lower aliphatic acid as a reaction medium. The reaction is carried out in the absence of a catalyst.

Diglucosylurea, one of the members of this group, is of interest in several fields. The most promising use of this compound is in the preparation of long chain diglucosylurea esters suitable for use in detergent formulations. These esters are prepared by an alcoholysis reaction between diglucosylurea and an ester of a fatty acid of the general formula

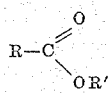

where R is an alkyl, alkenyl or alkadienyl radical having from 7 to 23 carbon atoms and R' is a lower alkyl radical up to and including hexyl. Generically, the compounds are described as mono fatty acid esters of diglucosylurea. Typical examples of such esters include the laurate, stearate, oleate, palmitate, etc. Diglucosylurea compounds have also been disclosed as useful supplements in compositions for feeding cattle.

I have discovered that the reaction of at least two moles of an aldose with one mole of urea in the presence of acetic acid at a temperature between 75° C. and the boiling point of the reaction mixture gives the diglycosylureas. The reaction is illustrated, for example, by the reaction of glucose and urea according to the equation:

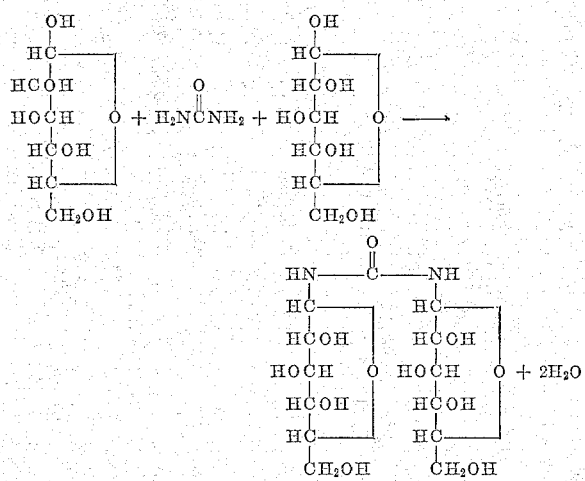

In the operation of the process of my invention the aldose and urea are dissolved in the organic acid and heated to about 90° C. for a period of time sufficient to dissolve the reactants and for the product diglycosylureas to precipitate. The product is separated using the conventional techniques and is purified by recrystallization from water and methanol.

The reaction of the aldoses with the ureas in a non-aqueous medium is more satisfactory than reaction in water in that in the non-aqueous medium there is less hydrolysis and the tendency toward degradation of the products or reactants is much less marked. The reaction is reversible and control of conditions is much easier where the reaction is carried on in a lower organic acid medium.

The choice of the reaction medium should be made on the basis of the properties of the aldose chosen. The reaction will go satisfactorily in the presence of any lower aliphatic acid such as, for example, acetic, propionic, butyric, etc. Because of its properties and availability, glacial acetic acid is the preferred medium for the reaction.

The diglycosylureas can be prepared by the reaction of urea with any aldose such as, for example, glucose, mannose, galactose, rhamnose, arabinose, xylose, etc. The diglucosyl compounds are of most interest commercially so that D-glucose is the preferred sugar for the reaction of my invention. The aldose selected is reacted with commercially available urea.

It is absolutely necessary to carry out the reaction at an increased temperature because of the problems of low solubility and low reactivity of these compounds in the organic acid medium. The aldoses alone are quite insoluble in glacial acetic acid; however, a mixture of glucose and urea, for example, dissolves in this acid at temperatures on the order of 85° C. In the process of my invention, the aldose and urea are heated to a temperature of about 50 to 125° C., depending on the aldose and the reaction medium, the preferred temperature range in most cases being 80 to 95° C.

The reaction time is crucial in that the materials must be heated together for a period long enough to dissolve the components and give the product an opportunity to crystallize from the solution. Thus, a satisfactory yield can be obtained at a reaction time of 1 to 24 hours, the preferred time being 6 to 8 hours.

Pressure is not critical but for reasons of economy and ease of operation, I prefer to carry out the reaction at atmospheric pressure. However, the reaction can be run at pressures up to about two to three atmospheres.

In order for the reaction to proceed satisfactorily, the reactants must be present in at least a stoichiometric ratio; that is, two moles of the aldose to one mole of urea. Although the reaction is much less reversible in lower aliphatic acid media the yields are improved if more than the number of moles of glucose required by the stoichiometry of the reaction are present in the reaction mixture. An excess of about 5 to 100 mole percent of the aldose gives satisfactory results. An excess of about 10 to 15 mole percent is preferred.

The acid solvent should be present in sufficient quantity to enable the mixture to be stirred without undue difficulty. Thus, it is preferred to have a weight of the low boiling aliphatic acid equal to the weight of the aldose present in the reaction mixture. However, satisfactory results can be obtained when a quantity equal to approximately 10% of the weight of the aldose is present as acid and good results are obtained when up to ten times this weight is present. Preferably the acid is present in an amount equal to about 0.25 to about 3.2 times the weight of the glucose. Under especially preferred conditions, the acid is present in an amount equal to 0.5 to 1.0 times the weight of the glucose present in the mixture.

The crude product is separated by crystallization from the mixture on standing at room temperature or on cooling. Isolation of the product diglycosylureas from the reaction mixture is accomplished by the standard methods well known to those versed in organic chemistry. Often the reaction mixture is first diluted with a quantity of the reactant medium in which case the product may separate directly from the reaction mixture on cooling. Separation may be promoted by the addition of a diluent such as alcohol to promote crystallization and decrease the solubility of the product in the reaction mixture. The crude product is best purified by recrystallization from aqueous methanol.

The purity of these compounds can be readily determined by their optical properties. Thus, the product of the condensation of α-D-glucose with urea either in an aqueous acid medium or in an organic acid medium, for example, is principally 1,3-bis-(β-D-glucopyranosyl)-urea. However, the other two isomers, namely 1,3-bis-(α-D-glucopyranosyl)-urea and 1-(α-D-glucopyranosyl)-3(β-D-glucopyranosyl)-urea, might also be produced simultaneously and may be present in the crude mixture along with any unreacted glucose. All of these compounds by virtue of their asymmetric carbon atoms are optically active; that is, their aqueous solutions rotate the plane of polarized light. D-Glucose is dextrorotatory and its specific optical rotation at equilibrium is approximately $[\alpha]_D^{25} = +52.5°$. On the other hand, 1,3-bis-(β-D-glucopyranosyl)-urea is levorotatory and its specific rotation is $[\alpha]_D^{25} = -37 \pm 1$. The α,α-isomer of 1,3-diglucopyranosylurea can be expected to be dextrorotatory while the α,β-isomer should be less dextrorotatory than the α,α-isomer and more dextrorotatory than the β,β-isomer. The effect of optically inactive contaminants will be to decrease the specific optical rotation of diglucosylurea. The presence of dextrorotatory contaminants will decrease the negative optical rotation of diglucosylurea considerably more. Purity measurements based on the optical rotation of the diglucosylurea product provide a much more convient method of determining its purity than, for instance, determination of the melting point. Diglucosylurea, for example, has no sharp melting point and decomposes gradually above 300° C.

The specific optical rotation of these compounds was used to determine the purity of the compounds as shown in the examples below. Any of the commercially available polarimeters can be used in making this determination.

The scope and utility of my invention is further illustrated by the following specific but non-limiting examples:

*Example I*

A charge of 150 grams (0.836 mole) of anhydrous D-glucose was placed in a three-necked flask equipped with a stirrer and a thermometer. A total of 25 grams (0.417 mole) of urea and 140 ml. of glacial acetic acid were added and the mixture heated for 8 hours at 90 to 95° C. with constant stirring. The glucose and urea dissolved after about 2.5 hours stirring at this temperature. At the end of the 8 hour period, the mixture was diluted with 200 ml. of methanol and kept at 5° C. for a period of about 20 hours. The crude product, 1,3-bis-(D-glucopyranosyl)-urea was recovered by centrifuging and was recrystallized from a mixture of water and methanol. The recrystallized product was filtered and dried at 80 to 100° C. in a vacuum oven to constant weight. The weight of the product was 55 grams which represented a yield of 33.3% of theoretical. The purity of the compound was determined by measurement of its specific optical rotation which, in this case, was $[\alpha]_D^{24} = -34.3°$.

*Example II*

A mixture of 12 grams (0.066 mole) of D-glucose, 2 grams (0.033 mole) of urea and 11 ml. of acetic acid was stirred for a period of about 1 to 2 hours at a temperature of 90 to 93° C. and a homogeneous solution was obtained. The solution was allowed to cool and 55 ml. of acetone was added. The precipitated material was filtered and dried under vacuum at room temperature. This material was hygroscopic and dextrorotatory, having an optical rotation of $[\alpha]_D^{24} = +44°$. This material was suspended in 12 ml. of fresh glacial acetic acid and stirred at 90 to 95° C. for 4½ hours. The slurry was diluted with 15 ml. of methanol and the product 1,3-bis-(D-glucopyranosyl)-urea was recovered by filtration. The weight of the product was 4.01 grams, representing a yield of 31.3% of theoretical. The specific optical rotation was $[\alpha]_D^{24} = -31.45°$.

*Example III*

A mixture of 150 grams (0.836 moles) of D-glucose, and 25 grams (0.417 mole) of urea were added to a three-necked flask equipped with a stirrer and a thermometer. A total of 140 ml. of glacial acetic acid was added and the mixture heated to 90 to 95° C. and stirred at that temperature for 8 hours. At the end of this period, the mixture was allowed to cool and was diluted with 200 ml. of methanol. The product had started to precipitate from the solution so the solution was cooled to 4° C. and kept at this temperature for nearly 20 hours, at which time the crude product 1,3-bis-(D-glucopyranosyl)-urea was recovered. The crude yield was 81 grams, which corresponds to 50.6% of theoretical. This product had a specific optical rotation of $[\alpha]_D^{24} = -27.3°$. This product was recrystallized from hot water and methanol and the purity, as evidenced by the specific optical rotation, was considerably improved. The specific optical rotation of the purified product was $[\alpha]_D^{24} = -36.25°$. A total of 59 grams of this purified product was recovered, which corresponds to a yield of 36.8% of theoretical.

These examples illustrate that a substantial yield of the diglucosylureas can be recovered when the reaction is run in an acetic acid medium.

*Example IV*

A mixture of 72 grams (0.4 mole) of anhydrous D-glucose and 12 grams (0.2 mole) of urea were added to a three-necked flask equipped with a stirrer and a thermometer. A total of 18 ml. of acetic acid (19 grams or 0.25 times the weight of the glucose) was added and the mixture heated to 80 to 90° C. and stirred at this temperature for a period of 6½ hours. At the end of this period, the mixture was allowed to cool and was diluted with 200 ml. of methanol. The product had started to precipitate from the solution so the solution was cooled to 4° C. and kept at this temperature for nearly 20 hours, at which time the crude product 1,3-bis-(D-glucopyranosyl)-urea was recovered. The crude yield was 26.5 grams, which corresponds to 34.5% of theoretical. The product was recrystallized from hot water and methanol and a total of 16 grams of purified product was recovered.

This example illustrates that a satisfactory yield of the product can be obtained when acetic acid is present in an amount equal to 0.25 times the weight of the glucose present in the reaction.

*Example V*

A mixture containing a total of 72 grams (0.4 mole) of anhydrous D-glucose and 12 grams (0.2 mole) of urea was heated to 80 to 90° C. in a three-necked flask equipped with a stirrer and thermometer. A total of 228 grams (or 216 ml. 3.16 times the weight of the D-glucose) was added. The mixture was heated to 80 to 90° C. for a period of 6½ hours with vigorous stirring. At the end of this period the mixture was allowed to cool and was diluted with 200 ml. of methanol. The product had started to precipitate from the solution so the solution was cooled to 4° C. and kept at this temperature for nearly 20 hours, at which time the crude product 1,3-bis-(D-glucopyranosyl)-urea was recovered. The crude yield was 23.5 grams or 36.5%. The crude diglucosylurea was recrystallized from aqueous methyl alcohol. A yield of 16 grams or 20.8% of purified product was recovered.

This example illustrates that a satisfactory yield of the diglucosylurea can be recovered when the acetic acid is present in about 3.16 times the weight of the D-glucose used in the reaction.

Example VI

The reaction of aldoses other than glucose in a lower aliphatic acid medium was shown by reacting mannose and galactose with urea in an acetic acid medium.

In the first of these runs, a mixture of 11 grams (0.0611 mole) of D-galactose, 1.8 grams (0.030 mole) of urea and 11 ml. of glacial acetic acid were heated in a small resin kettle at 90 to 105° C. for three hours. A true solution resulted after three hours' stirring. The ingredients were allowed to react at a temperature of 90 to 95° C. for an additional three hours. At the end of this period, the mixture was diluted with 15 ml. of methanol, cooled to 4° C. and maintained at that temperature for 20 hours. The product was separated by filtration and recrystallized from a hot water-methanol solution at room temperature and 4° C. A yield of 2.3 grams of the material was recovered. This yield represents 19.7% of theoretical. This product was recrystallized several times by dissolving it in the minimum quantity of hot water and precipitating from the aqueous solution by adding a large amount of methanol. The specific optical rotation of the purified material was found to be $[\alpha]_D^{24} = +9.56°$. The infra-red spectrum of the material was very similar to that of the known diglucosylurea.

Example VII

In the second of these runs, a mixture of 12 grams (0.066 mole) of D-mannose, 2 grams (0.33 mole) of urea and 11 ml. of acetic acid were heated to 90 to 95° C. in a resin kettle. A clear solution of the ingredients was obtained after 45 minutes at this temperature. After an additional one and a half hours, the product began to separate and was diluted with a total of 20 ml. of acetic acid. Heating was continued for an additional 4½ hours. At the end of this reaction period, the mixture was diluted with 30 ml. of methanol, cooled to 4° C. and maintained at that temperature for 72 hours. The crude product, dimannosylurea, was collected by filtration, washed with methanol and acetone and vacuum dried at 80 to 90° C. A total of 9.5 grams of this product was recovered. This represents a 74.2% yield. The specific optical rotation of this product was $[\alpha]_D^{24} = -40.3°$. The material was purified by recrystallization several times from a water-methanol solution. A total of 5 grams, or 39% yield, of this pure product was recovered. The pure product had a specific optical rotation of $[\alpha]_D^{23} = -49.6°$. The infra-red spectrum of this product is very similar to that of diglucosylurea.

These examples illustrate the reaction of aldoses other than glucose with urea in a non-aqueous lower aliphatic acid medium.

Example VIII

A detergent composition was prepared using the diglucosylurea intermediate of this invention by esterifying this compound to form the diglucosylurea laurate and compounding the resultant product. The composition was prepared by forming a 60% solids slurry containing about 40% sodium tripolyphosphate, about 10% tetrasodium pyrophosphate, about 10% sodium metasilicate pentahydrate, about 19.5% sodium sulfate, about 20% diglucosylurea laurate and about 0.5% sodium carboxymethylcellulose. This slurry was vigorously agitated at about 140° F. to form a homogeneous mixture. It was then dried in heated air at a temperature of about 350° F. with a resultant moisture loss of about 40%. The resulting composition was recovered as a powder which possessed a high grade of detersive and foaming properties in both hard and soft water. The resulting detergent was shown to be very effective for heavy duty cleaning purposes in tests of the cleaning properties of the detergent using soiled cotton.

This example illustrates one of the uses of the compounds of this invention; that is, the use of the compound as an intermediate in the preparation of detergent formulations.

This application is a continuation in part of application Serial No. 4,874, filed January 27, 1960, now abandoned.

Obviously many modifications and variations of the invention as hereinabove set forth may be made without departing from the essence and scope thereof and only such limitations should be applied as are indicated in the appended claims.

What is claimed is:

1. A non-catalytic process for the preparation of diglycosylureas which comprises heating at least two moles of an aldose with one mole of urea under initially anhydrous conditions at a pressure of atmospheric to about 2 to 3 atmospheres in the presence of a quantity of a lower aliphatic acid having 2 to 4 carbon atoms equal to 0.25 to 3.2 times the weight of aldose present and recovering the product diglycosylurea.

2. A non-catalytic process for preparing 1,3-diglucosylurea which comprises heating a mixture consisting essentially of at least two moles of glucose with one mole of urea under initially anhydrous conditions at a pressure of atmospheric to about 2 to 3 atmospheres at a temperature of 150 to 125° C. for a period of 1 to 24 hours in the presence of a quantity of acetic acid equal to 0.5 to 1 times the weight of glucose present, cooling the reaction mixture, recovering the crude 1,3-diglucosylurea and purifying said product by recrystallization.

3. A non-catalytic process for preparing 1,3-diglucosylurea which comprises heating a mixture consisting essentially of two to four moles of glucose with one mole of urea at a temperature of 80 to 95° C. for a period of 6 to 8 hours at a pressure of atmospheric to about 2 to 3 atmospheres in the presence of a quantity of acetic acid equal to the weight of glucose present, cooling the reaction mixture to a temperature below 15° C., separating the crude 1,3-diglucosylurea and purifying said product by recrystallization from an aqueous methanol solution.

4. A non-catalytic process for the preparation of 1,3-digalactosylurea which comprises heating a mixture consisting essentially of two to four moles of galactose with one mole of urea at a temperature of 90 to 105° C. for a period of 6 to 8 hours at a pressure of atmospheric to about 2 to 3 atmospheres in the presence of a quantity of acetic acid equal to the weight of galactose present, cooling the reaction mixture to a temperature below 15° C., separating the crude 1,3-digalactosylurea and purifying said product by recrystallization from an aqueous methanol solution.

5. A non-catalytic process for the preparation of 1,3-dimannosylurea which comprises heating a mixture consisting essentially of two to four moles of mannose with one mole of urea to a temperature of 80 to 95° C. for a period of 6 to 8 hours at a pressure of atmospheric to about 2 to 3 atmospheres in the presence of a quantity of acetic acid equal to the weight of mannose present, cooling the reaction mixture to a temperature below 15° C., separating the crude 1,3-dimannosylurea and purifying said product by recrystallization from an aqueous methanol solution.

References Cited by the Examiner
UNITED STATES PATENTS

| | | | |
|---|---|---|---|
| 2,612,497 | 9/52 | Meyer | 260—211.5 |
| 3,020,273 | 2/62 | Steadman et al. | 260—211.5 |
| 3,023,205 | 2/62 | Steyermark et al. | 260—211.5 |

LEWIS GOTTS, *Primary Examiner.*